United States Patent [19]

Heinz et al.

[11] Patent Number: 4,666,973
[45] Date of Patent: May 19, 1987

[54] IMPACT-RESISTANT, THERMOPLASTIC POLYESTER MOLDING MATERIALS

[75] Inventors: Gerhard Heinz, Weisenheim; Graham E. McKee, Weinheim; Georg N. Simon, Limburgerhof; Friedrich Kleber, Worms; Manfred Knoll, Wachenheim, all of Fed. Rep. of Germany

[73] Assignee: BASF Aktiengesellschaft, Fed. Rep. of Germany

[21] Appl. No.: 803,577

[22] Filed: Dec. 2, 1985

[30] Foreign Application Priority Data

Dec. 19, 1984 [DE] Fed. Rep. of Germany ....... 3446225

[51] Int. Cl.$^4$ ............................................. C08L 67/02
[52] U.S. Cl. ...................................... 524/504; 525/64
[58] Field of Search ........................... 525/64; 524/504

[56] References Cited

U.S. PATENT DOCUMENTS

| | | | |
|---|---|---|---|
| 3,564,077 | 2/1971 | Brinkmann et al. | 525/173 |
| 3,919,353 | 11/1975 | Castelnuovo et al. | 525/64 |
| 4,292,233 | 9/1981 | Binsack et al. | 525/69 |
| 4,417,026 | 11/1983 | Lindner | 525/64 |
| 4,535,124 | 8/1985 | Binsack | 525/64 |

FOREIGN PATENT DOCUMENTS 0022216 11/1983 European Pat. Off. .
0056123 10/1984 European Pat. Off. .

Primary Examiner—John C. Bleutge
Assistant Examiner—Patricia Short
Attorney, Agent, or Firm—Keil & Weinkauf

[57] ABSTRACT

Impact-resistant thermoplastic polyester molding materials are prepared by thoroughly mixing A. from 52 to 99 parts by weight of a melt of one or more polyalkylene terephthalates with
B. from 1 to 48 parts by weight of one or more elastomeric graft polymers prepared by emulsion polymerization and composed of
  1. from 70 to 90% by weight of a grafting base consisting of elastomeric polymers having a gel content of not less than 80% and a glass transition temperature Tg of less than −20° C. and
  2. from 10 to 30% by weight of a grafted shell consisting of one or more polymers having a glass transition temperature Tg greater than 40° C., in the form of an aqueous dispersion in which not less than 80% of the particles of graft polymer B have a size of from 0.05 to 0.15 μm, with simultaneous removal of the water which vaporizes.

5 Claims, No Drawings

IMPACT-RESISTANT, THERMOPLASTIC POLYESTER MOLDING MATERIALS

It is known that the impact strength of thermoplastic polyesters can be improved by mixing them with elastomeric polymers. German Laid-Open Application DOS No. 1,694,173 discloses polyester molding materials which contain a polybutadiene rubber grafted with styrene. Furthermore, German Pat. No. 2,348,377 discloses that crosslinked graft polymers based on polybutadiene and having a grafted shell of styrene/methyl methacrylate are useful for increasing the impact strength of polyesters. Finally, European Patent Application No. 22,216 discloses that polybutadiene rubbers which are crosslinked and are also grafted with styrene/acrylonitrile can be added to polyesters, as tougheners. Moreover, European Pat. No. 56,123 states that a graft rubber which has been precipitated and dewatered mechanically to a particular water content is mixed with a polyester melt in order to improve the impact strength. However, the disadvantage of the known impact-resistant polyester molding materials is that their low-temperature impact strength is unsatisfactory.

It is an object of the present invention to provide impact-resistant polyester molding materials which possess improved low-temperature impact strength as well as improved flow and surface quality.

We have found that this object is achieved by impact-resistant thermoplastic polyester molding materials which are prepared by thoroughly mixing A. from 52 to 99 parts by weight of a melt of one or more polyalkylene terephthalates with
B. from 1 to 48 parts by weight of one or more elastomeric graft polymers prepared by emulsion polymerization and composed of
  1. from 70 to 90% by weight of a grafting base consisting of a polymer having a gel content of not less than 80% and a glass transition temperature Tg of less than $-20°$ C. and
  2. from 10 to 30% by weight of a grafted shell consisting of one or more polymers having a glass transition temperature Tg greater than 40° C., in the form of an aqueous dispersion in which not less than 80% of the particles of graft polymer B have a size of from 0.05 to 0.15 $\mu$m, with simultaneous removal of the water which vaporizes.

The novel polyester molding materials have an improved low-temperature impact strength, as well as the advantage of improved flow and surface quality.

The polyalkylene terephthalates used as component A advantageously have an intrinsic viscosity of from 80 to 170, in particular from 110 to 150, measured on a 0.5% strength by weight solution in a 1:1 phenol/o-dichlorobenzene mixture at 25° C. Preferred polyalkylene terephthalates are derived from alkanediols of 2 to 6 carbon atoms. The polyesters may contain as much as 10 mol % of components derived from other dicarboxylic acids, such as isophthalic acid, alkanedicarboxylic acids of 6 to 36 carbon atoms, naphthalenedicarboxylic acids or halogenated aromatic dicarboxylic acids, or may contain branched alkanediols, such as neopentylglycol, 1- or 2-methylbutane-1,4-diol, 2-ethylhexane-1,6-diol or dimethylbutanediol. The polyesters used may furthermore contain as much as 1 mol % of tribasic or polybasic polycarboxylic acids or polyols, such as pyromellitic acid, trimellitic acid, trimethylolpropane or pentaerythritol.

Polyethylene terephthalate and polybutylene terephthalate and mixtures of these have become particularly important industrially.

The molding materials according to the invention contain from 52 to 99, in particular from 70 to 85, parts by weight of one or more polyalkylene terephthalates as component A.

The novel thermoplastic polyester molding materials contain, as component B, from 1 to 48, in particular from 15 to 30, parts by weight of one or more elastomeric graft polymers prepared by emulsion polymerization. Of course, the amounts of A and B sum to 100 parts by weight.

Rubber-like graft polymers of this type are known per se. They are composed of 1. from 70 to 90, in particular from 75 to 85, % by weight of a grafting base which consists of an elastomeric polymer having a gel content of not less than 80% and a glass transition temperature Tg of less than $-20°$ C. Suitable grafting bases are prepared by, for example emulsion polymerization of butadiene, isoprene, and esters of (meth)acrylic acid with alkanols of 2 to 6 carbon atoms, and
2. from 10 to 30, in particular from 15 to 25, % by weight of a grafted shell which consists of one or more polymers having a glass transition temperature Tg greater than 40° C. Styrene, styrene/acrylonitrile and methyl methacrylate have proven particularly useful as graft monomers. The grafted shell may furthermore contain adhesion-promoting groups, which are introduced by the concomitant use of glycidyl (meth)acrylate. Other advantageous graft polymers are those which possess a grafted shell composed of a plurality of shells, the outer shell consisting of methyl methacrylate and, if appropriate, glycidyl methacrylate.

Graft rubbers which have proven particularly useful are those which are composed of a grafting base which consists of not less than 90% of butadiene and is grafted with a mixture of styrene/acrylonitrile in a weight ratio of from 3.5:0.5 to 2.5:1.5 or with methyl methacrylate.

The aqueous graft polymer dispersion (component B) obtained by emulsion polymerization has, as a rule, a solids content of from 35 to 60, in particular from 45 to 55, % by weight. In this aqueous dispersion, not less than 80% of the particles of graft polymer B have a size of from 0.05 to 0.15 $\mu$m.

The molding materials according to the invention may furthermore contain assistants, such as antioxidants, stabilizers and reinforcing agents in effective amounts.

The novel molding materials are prepared by thoroughly mixing a melt of the polyalkylene terephthalate used as component A with an aqueous dispersion of component B and simultaneously removing the water which vaporizes. In an advantageous procedure, the polyester A is first plasticized in an extruder, the graft rubber dispersion is added via feed orifices arranged along the extruder and is mixed thoroughly with the polymer melt, and water and volatile constituents are removed via a devolatilization orifice. The material is then extruded, and the extrudates are cooled and comminuted. The blending temperature is, as a rule, from 200° to 270° C.

Molding materials according to the invention advantageously contain from 10 to 100, in particular from 10 to 50, parts by weight of glass fibers per 100 parts by weight of the blend of components A and B. The glass fibers present in the molding material generally have a length of from 0.1 to 0.5 mm, preferably from 0.15 to 0.30 mm and a diameter of about 6–20 μm, preferably from 10 to 14 μm. Glass fibers of E glass are particularly preferred. In order to achieve better adhesion, the glass fibers are advantageously coated with an organosilane, such as an aminoalkylsilane, in particular an aminoalkyltrialkoxysilane, e.g. γ-aminopropyltriethoxysilane.

The novel molding materials are useful for the production of shaped articles by injection molding.

The Examples which follow illustrate the invention.

EXAMPLE 1

A dispersion of polybutadiene was grafted, at 70° C., with a mixture of styrene and acrylonitrile in a weight ratio of 3:1. The grafted shell consisting of styrene/acrylonitrile accounted for 20% by weight of the graft rubber. The gel content of the grafting base was 98%, the resulting dispersion had a solids content of 45.5% by weight, and 80% of the particles in the graft rubber were 0.15 μm in size. 80 parts by weight of polybutylene terephthalate were plasticized in a twin-screw extruder, and 20 parts by weight, calculated as solids, of the above graft rubber in the form of a 45.5% strength by weight dispersion were added to the melt at 240° C. via a feed orifice along the extruder. The water which vaporized was removed, the resulting material was extruded and the extrudates were comminuted.

Small standard bars were produced from this molding material by injection molding at a melt temperature of 260° C., and the notched impact strength was determined according to DIN 53,453.

The flow was determined from the flow path of the melt in a spiral having a diameter which increases continuously to 175 mm and a cross-section of 2×10 mm, at a constant injection pressure of 92 bar, a mold temperature of 60° C. and a melt temperature of 260° C. The resulting values represent the length of the flow path in cm. The results obtained are shown in Table 1.

COMPARATIVE EXAMPLE 1

The procedure described in Example 1 was followed, except that a graft rubber dispersion in which 50% of the particles had a size of 0.3 μm was used. The properties of the resulting polybutylene molding material containing 20% by weight of graft rubber are shown in Table 1.

COMPARATIVE EXAMPLE 2

The procedure described in Comparative Example 1 was followed, except that the rubber was precipitated by adding a 10% strength by weight magnesium sulfate solution at 70° C. The graft polymer was filtered over a suction filter, and the residue was washed thoroughly with water. The crumbly material was suction-filtered thoroughly and then dried at 60° C. under reduced pressure. 20 parts by weight of the dry rubber material were mixed with 80 parts by weight of polybutylene terephthalate (intrinsic viscosity 145) in an extruder at 230°–250° C. The properties of the resulting molding material are shown in Table 1 below.

COMPARATIVE EXAMPLE 3

The graft polymer dispersion used contained polybutadiene having a gel content of 98% as the grafting base and was grafted with styrene/acrylonitrile (weight ratio 3:1). The grafted shell accounted for 40% of the graft rubber. 50% of the particles of the graft rubber in the dispersion have a size of 0.3 μm. The dispersion was precipitated as described in Comparative Example 2, and the rubber was mixed into a melt of polybutylene terephthalate. The properties of the resulting molding material are shown in Table 1 below.

TABLE 1

|  | Example No. | Comparative Examples | | |
| --- | --- | --- | --- | --- |
|  | 1 | 1 | 2 | 3 |
| Notched impact strength $a_k$ [kJ/m$^2$] | | | | |
| 23° | 32 | 38 | 25.5 | 9.3 |
| −20 | 28 | 20 | 10.4 | 5.0 |
| −40 | 13 | 10 | 7.2 | 3.3 |
| −60 | 7.5 | 5 | 4.2 | — |
| Flow path mm | 50 | 42.09 | | |

EXAMPLES 2 to 5

The procedure described in Example 1 was followed, except that glass fibers were additionally incorporated into the melt. The amounts of polybutylene terephthalate, rubber and glass fibers and the properties of the resulting molding material are shown in Table 2.

TABLE 2

| Examples | 2 | 3 | 4 | 5 |
| --- | --- | --- | --- | --- |
| Polyester, % by weight | 75 | 80 | 60 | 70 |
| Rubber, % by weight | 25 | 20 | 40 | 30 |
| Glass fibers, % by weight, based on polymer blend | 10 | 20 | 20 | 15 |
| Residue on ignition, % | 9.7 | 20.3 | 20.5 | 14.2 |
| Tensile strength [N/mm$^2$] | 55.7 | 87.3 | 63.2 | 60.7 |
| Tensile modulus of elasticity [N/mm$^2$] | 2890 | 5400 | 4170 | 3470 |
| maximum flexural stress [N/mm$^2$] | 74.7 | 116.4 | 76 | 76.95 |
| Impact strength [kJ/m$^2$] | | | | |
| 23° | 40.2 | 38.6 | 46 | 44 |
| −40° | 49.4 | 48.8 | 51 | 49.4 |
| −60° | 53.1 | 51.1 | 55 | 53.3 |
| Notched impact strength [kJ/m$^2$] | | | | |
| 23° | 16.8 | 16.1 | 20.7 | 19 |
| −40° | 12.6 | 11 | 8.7 | 15 |
| −60° | 10.8 | 8.7 | 11 | 11.8 |

We claim:
1. An impact-resistant thermoplastic polyester molding material, prepared by thoroughly mixing
A. from 52 to 99 parts by weight of a melt of one or more polyalkylene terephthalates with
B. from 1 to 48 parts by weight of one or more elastomeric graft polymers prepared by emulsion polymerization and composed of
  1. from 70 to 90% by weight of a grafting base consisting of elastomeric polymers having a gel content of not less than 80% and a glass transition temperature Tg of less than −20° C. and
  2. from 10 to 30% by weight of a grafted shell consisting of one or more polymers having a glass transition temperature Tg greater than 40° C., in the form of an aqueous dispersion in which not less than 80% of the particles of graft polymer B have a size of from 0.05 to 0.15 μm, with simultaneous removal of the water which vaporizes.

2. The thermoplastic polyester molding material of claim 1, wherein component B is composed of a grafting base consisting of not less than 90% by weight of polybutadiene and a grafted shell consisting of a mixture of styrene and acrylonitrile in a ratio of from 3.5:0.5 to 2.5:1.5.

3. The thermoplastic polyester molding material of claim 1, wherein component B is composed of a grafting base which consists of not less than 90% of butadiene, and the grafted shell consists of methyl methacrylate.

4. The thermoplastic polyester molding material of claim 1, wherein the grafted shell is produced by multi-stage polymerization, and the outer shell consists of methyl methacrylate.

5. The thermoplastic molding material of claim 1, which contains from 10 to 100 parts by weight of glass fibers per 100 parts by weight of the mixture of components A and B.

* * * * *